(12) United States Patent
Bathelier et al.

(10) Patent No.: US 12,496,951 B2
(45) Date of Patent: Dec. 16, 2025

(54) METHOD FOR MANUFACTURING INNER LININGS FROM A SANDWICH STRUCTURE

(71) Applicant: ADLER PELZER FRANCE GRAND-EST, Mouzon (FR)

(72) Inventors: Xavier Bathelier, Saint Pierremont (FR); Daniel Baudet, Mouzon (FR); Jessy Tavenaux, Raucourt et Flaba (FR)

(73) Assignee: ADLER PELZER FRANCE GRAND-EST, Mouzon (FR)

( * ) Notice: Subject to any disclaimer, the term of this patent is extended or adjusted under 35 U.S.C. 154(b) by 481 days.

(21) Appl. No.: 17/978,188

(22) Filed: Oct. 31, 2022

(65) Prior Publication Data

US 2023/0137495 A1     May 4, 2023

(30) Foreign Application Priority Data

Oct. 29, 2021   (FR) ................... FR 21 11531

(51) Int. Cl.
*B32B 7/09*   (2019.01)
*B32B 5/26*   (2006.01)
(Continued)

(52) U.S. Cl.
CPC ............ *B60N 3/048* (2013.01); *B32B 5/275* (2021.05); *B32B 7/06* (2013.01); *B32B 7/09* (2019.01);
(Continued)

(58) Field of Classification Search
CPC .......... D04H 11/08; D04H 11/02; D04H 1/46; D04H 1/498; B32B 7/09
See application file for complete search history.

(56) References Cited

U.S. PATENT DOCUMENTS

| | | | |
|---|---|---|---|
| 4,651,393 A | | 3/1987 | Dilo |
| 5,144,730 A | * | 9/1992 | Dilo .................. D04H 13/00 |
| | | | 28/109 |

(Continued)

FOREIGN PATENT DOCUMENTS

| | | |
|---|---|---|
| EP | 0183952 B1 | 1/1989 |
| EP | 0520911 A1 | 12/1992 |

(Continued)

OTHER PUBLICATIONS

Preliminary Research Report corresponding to French Application No. 2111531, dated May 23, 2022, 2 pages.

*Primary Examiner* — Jillian K Pierorazio
(74) *Attorney, Agent, or Firm* — Reising Ethington P.C.

(57) ABSTRACT

A method and system for the production of a web the fibers of which form a mean angle with respect to the longitudinal direction. The method and system include the passage of the web through a looping system, the passing of the web over a conveyor provided with brushes, the deposition of a first pre-needle-punched layer of fibers over the accumulated undulations, the assembling of the accumulated undulations with the first pre-needle-punched layer by needling, the assembling of the structure with a second pre-needle-punched layer of fibers, so as to obtain a sandwich structure, and the separation of the sandwich structure so as to obtain two symmetrical velour coverings. The web is a card web with a mean angle between 5 and 10° and an area density between 80 and 120 g/m². The method includes a longitudinal drawing of the web, with a stretch ratio between 1.5 and 2.

9 Claims, 4 Drawing Sheets

(51) Int. Cl.
  *B32B 7/06* (2019.01)
  *B32B 38/00* (2006.01)
  *B32B 38/10* (2006.01)
  *B60N 3/04* (2006.01)

(52) U.S. Cl.
  CPC .......... *B32B 38/10* (2013.01); *B32B 38/1875* (2013.01); *B32B 2250/02* (2013.01); *B32B 2250/24* (2013.01); *B32B 2307/514* (2013.01); *B32B 2307/718* (2013.01); *B32B 2307/732* (2013.01); *B32B 2605/003* (2013.01)

(56) References Cited

U.S. PATENT DOCUMENTS

| | | |
|---|---|---|
| 5,476,703 A | 12/1995 | Wattel |
| 6,432,234 B1 | 8/2002 | Bathelier |
| 11,168,418 B2 | 11/2021 | Bathelier |
| 2010/0223715 A1* | 9/2010 | Lyons .................. B32B 7/04 2/455 |
| 2012/0235438 A1* | 9/2012 | Roding .................. B60N 3/048 28/165 |
| 2016/0122922 A1* | 5/2016 | Le Costaouec ........ D03D 37/00 28/271 |
| 2019/0009701 A1* | 1/2019 | De Smet .............. D06N 7/0068 |
| 2021/0008830 A1* | 1/2021 | Cividini ................ F16D 65/126 |
| 2023/0249436 A1* | 8/2023 | Lee .................... B65D 81/3823 428/36.1 |
| 2023/0277446 A1* | 9/2023 | Mellin ................. A61K 9/0056 424/400 |
| 2023/0374710 A1* | 11/2023 | Bernhardt .............. B32B 27/34 |

FOREIGN PATENT DOCUMENTS

| | | |
|---|---|---|
| EP | 0516964 B1 | 11/1996 |
| EP | 0859077 A1 | 8/1998 |
| FR | 2174880 A1 | 10/1973 |
| FR | 3041001 A1 | 3/2017 |
| GB | 1393210 A1 | 2/1973 |

\* cited by examiner

100;
METHOD FOR MANUFACTURING INNER LININGS FROM A SANDWICH STRUCTURE

TECHNICAL FIELD

The invention relates to a method for producing interior coverings, especially a floor covering for a motor vehicle.

Manufacturing processes for interior coverings for motor vehicles are already known in the prior art, based on the use of a DILOUR® machine.

BACKGROUND

A particular feature of such a machine is that same includes conveyors covered with brushes which serve for forming a homogeneous velour. Such machine includes a needle-punching system the needles of which move along the fibers of a layer deposited on the conveyor through the bristles of the brushes.

The operation of such a machine and of the components forming same, is described in detail in EP 0 183 952.

A covering manufacturing process is further known from the prior art, in particular according to FR 1 558 413, which comprises a step of making a fiber web having a given mean orientation with respect to a longitudinal direction, followed by a step of passing the web through a looping system comprising a set of rotating disks and fixed looping elements, so as to generate undulations.

According to such method, the web is formed by piling with fiber interlacing, the web being folded onto itself before being drawn in a drawing system so as to obtain a desired orientation of the fibers.

It should be noted, however, that the piling system and the drawing system are generally expensive, which has an impact on the economic interest of the covering. In addition, the drawing carried out is generally significant, in particular having a stretch ratio which can attain a value of 5, which can lead to irregularities in the web and hence in the final covering.

SUMMARY

A purpose of the invention in particular is to overcome such drawbacks by providing a method for manufacturing a covering, simpler and more economical to implement, while allowing a good quality covering to be produced.

To this end, the subject matter of the invention relates in particular, to a method for manufacturing floor coverings for motor vehicles, comprising:
a step of producing a fiber web, elongated along a longitudinal direction, the fibers of which have an orientation forming a mean angle with respect to the longitudinal direction,
a step of passing the fiber web, along the longitudinal direction, through a looping system comprising a set of rotating disks and fixed looping elements, so as to generate undulations,
following the passing step, a step of bringing the layer over a conveyor equipped with brushes, and of accumulating the undulations in the brushes so as to reach a predetermined density,
a step of depositing a first pre-needle-punched layer of fibers over the accumulated undulations,
a step of assembling the accumulated undulations with the first pre-needle-punched layer by needle-punching through the brushes so as to obtain a structure, characterized in that the method comprises:

a step of assembling the structure with a second pre-needle-punched layer of fibers, so as to obtain a sandwich structure, and
a step of separating the sandwich structure so as to obtain two symmetrical velour coverings,
and in that:
the web is a card web with a mean orientation angle of the fibers comprised between 5 and 10° and an area density comprised between 80 and 120 g/m2,
the method comprises, prior to the passing step, a step of longitudinal drawing of the web, with a stretch ratio comprised between 1.5 and 2, for reducing the area density thereof.

The method provides for producing the covering from a sandwich structure, by separating the structure.

To this end, an orientation of the fibers with a mean angle comprised between 5 and 10° appears to be optimal for obtaining a sandwich structure with adequate height. Thus, a simple card web is used in the present process.

In order to further optimize the method, additional drawing may be carried out before the looping step, with a stretch ratio less than 2. In this way, it is possible to reduce the area density of the web and to limit the forces applied to the fibers during the process.

The method can further have one or more of the features below, taken individually or according to all technically conceivable combinations.

The undulations are formed by loops each having a predefined width G along a transverse direction perpendicular to the longitudinal direction, and a predefined height H along an elevation direction perpendicular to the longitudinal and transverse directions, the mean angle α of orientation of the fiber of web (20) with respect to the longitudinal direction (X), fulfilling the relation sin α=G/2H within an accuracy of +/−5°.

The fibers of the web, the fibers of the first layer and the fibers of the second layer are chosen from fibers made of a thermoplastic polymer, such as polypropylene, polyethylene terephthalate, polyamide, polylactic acid, the mixtures thereof or the copolymers thereof, or fibers of natural origin such as flax or hemp fibers used alone or in mixtures.

The fibers of the web, the fibers of the first layer and the fibers of the second layer are all made of the same material.

At least two sets of fibers among the fibers of the web, the fibers of the first layer and the fibers of the second layer are made of different materials.

The manufacturing method comprises, following the step of assembling the accumulated undulations with the first pre-needle-punched layer by needle-punching and prior to the step of assembling the structure with the second layer, a step of turning the structure over.

The invention further relates to a system for manufacturing floor coverings for motor vehicles, comprising:
a system for making a fiber web elongated along a longitudinal direction configured for giving the fibers an orientation forming a mean angle with respect to the longitudinal direction,
a looping system comprising a set of rotating disks and fixed looping elements, so as to generate undulations,
a conveyor equipped with brushes, arranged at the output of the looping system for accumulating the undulations in the brushes so as to reach a predetermined density,
a first system for depositing a first pre-needle-punched layer of fibers over the accumulated undulations, a first needle-punching system for assembling the accumulated undulations with the first pre-needle-punched layer by needle-punching through the brushes so as to obtain a structure, characterized in that the manufacturing system comprises:

a second system for depositing a second pre-needle-punched layer of fibers over the accumulated undulations of the structure, so as to obtain a sandwich structure, and a system for separating the sandwich structure so as to obtain two symmetrical velour coverings, and in that:

the web-making system is a carding machine configured so that the card web produced has a mean fiber orientation angle comprised between 5 and 10° and a density area comprised between 80 and 120 g/m$^2$, the manufacturing system includes, upstream of the looping system, a system for the longitudinal drawing of a web, configured for applying a stretch ratio comprised between 1.5 and 2.

The manufacturing system according to the invention can further have one or more of the features below, taken individually or according to all technically conceivable combinations.

The drawing system includes a first set of upstream drive rollers, and a second set of downstream drive rollers, the downstream drive rollers of the second set being apt to rotationally move with a speed of rotation higher than the speed of rotation of the upstream drive rollers of the first set so that the card web is not moved along with the same speed over the entire length thereof.

The manufacturing system includes, downstream of the first needle-punching system and upstream of the second deposition system, a system for turning the structure over.

BRIEF DESCRIPTION OF THE DRAWINGS

Different features and advantages of the invention will appear upon reading the following description, given only as a non-limiting example, and making reference to the annexed figures, amongst which.

DETAILED DESCRIPTION

Figure 1:
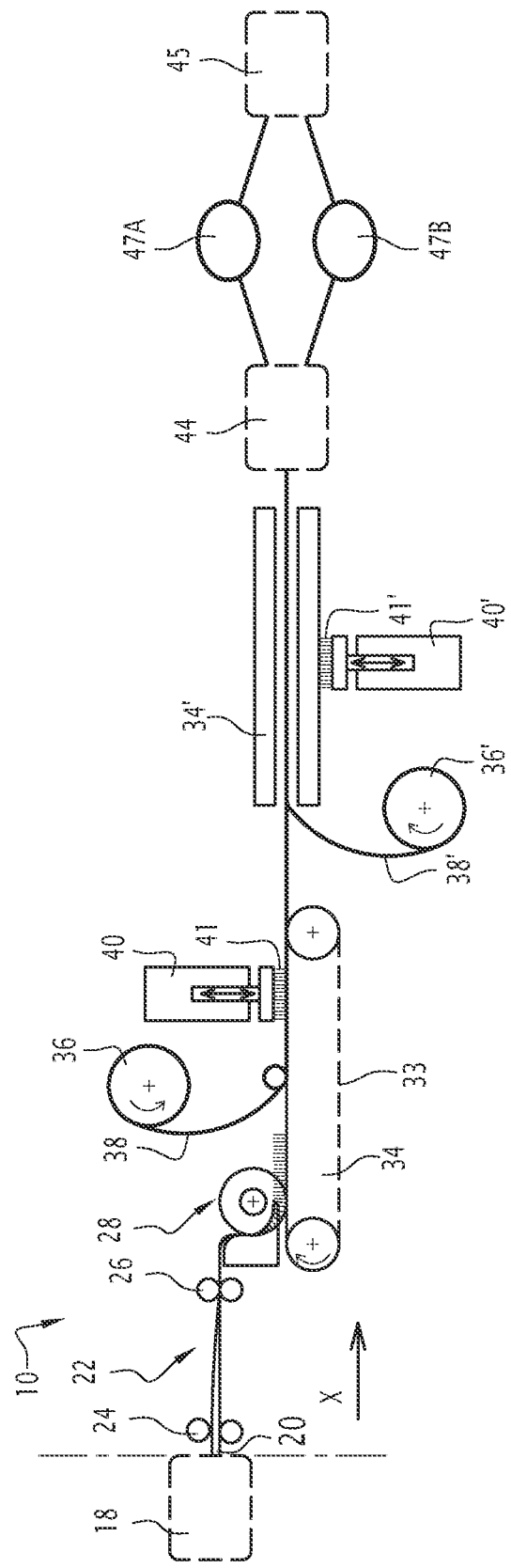
FIG. 1 schematically illustrates a system for manufacturing a covering according to an example of embodiment of the invention.

FIG. 1 shows a system 10 for manufacturing needle-punched coverings 12, 12'. The manufacturing system 10 can be used by putting in practice a method for manufacturing coverings according to an example of an embodiment of the invention.

Figure 2:
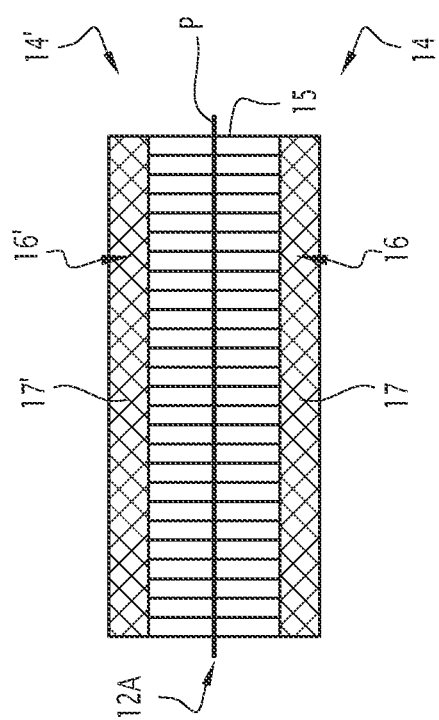
FIG. 2 schematically shows, in a side view, a sandwich structure manufactured using the system shown in FIG. 1, before a separation step.

The coverings 12, 12' are produced by separating in two, a sandwich structure 12A as shown in FIG. 2 along a plane of symmetry P, as will be subsequently explained in greater detail.

Figure 3:
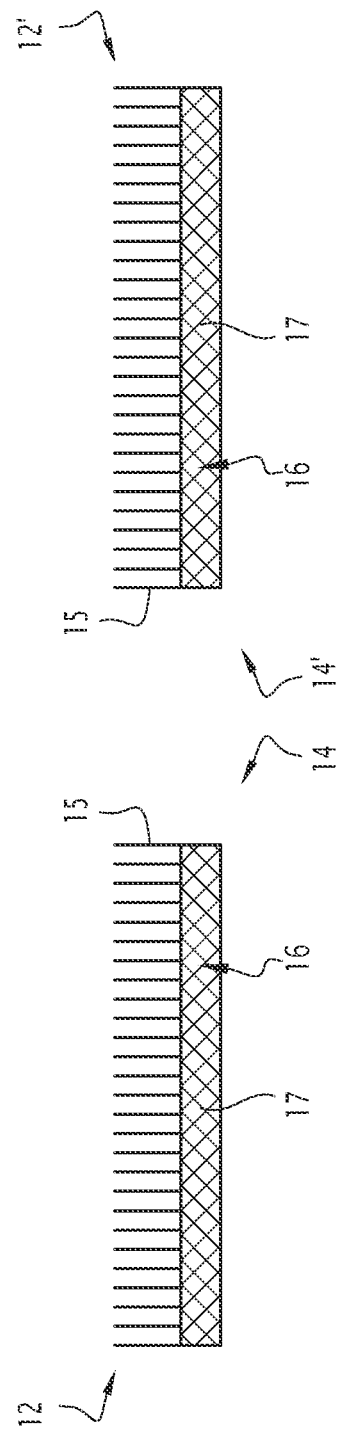
FIG. 3 schematically shows, in a side view, coverings produced by separating the sandwich structure shown in FIG. 2.

The coverings 12, 12' obtained after separation are shown in FIG. 3. The coverings 12, 12' are identical, so that a joint description thereof will be given hereinafter.

Each covering 12, 12' forms e.g. an interior covering, and more particularly an interior covering for a motor vehicle, said covering intended to be placed on the floor or on a wall of the vehicle. As a variant, the covering 12, 12' can form any conceivable interior covering.

Each covering 12, 12' has a face layer 14, 14' of unbonded fibers 15 parallel to each other, and a back layer 16, 16' forming a sole essentially consisting of fibers 17, 17' bonded to each other.

The fibers 15 and 17, 17' are e.g. made of a thermoplastic polymer, such as polypropylene, polyethylene terephthalate (PET), polyamide, polylactic acid, mixtures thereof or copolymers thereof. As a variant, the fibers 15 and 17, 17' can be fibers of natural origin such as flax or hemp fibers used alone or in mixtures.

The fibers 15 and 17, 17' can be of different natures. The fibers 15 can be made of polyamide whereas the fibers 17, 17' are made of PET. At the same time, the fibers 17 and the fibers 17' can be of the same nature, or in a variant, of a different nature.

The layers 14 and 16, 16' can consist of a mixture comprising a percentage of binding fibers, i.e. e.g., of bicomponent fibers, one of the components of which has a lower melting temperature than the other component.

The face layer 14 has a velour exterior appearance. Said velour consists of the fibers 15.

The thickness of the face layer 14 is generally greater than the thickness of the sole 16. The face layer 14 has e.g. a thickness comprised between 2 and 8 mm.

The velour density of the face layer 14 is preferentially between 0.05 and 0.1 g/cm$^3$, e.g. between 0.07 and 0.08 g/cm$^3$. Such a density gives a beautiful appearance, good abrasion resistance and ease of cleaning.

Said density is measured e.g. by determining the ratio between the mass of the material obtained by shaving the entire face layer 14 down to the sole 16, 16', compared to the initial volume of the shaved layer.

The yield of the velour, consisting of the ratio of the weight of velour after total shaving down to the sole compared to the total weight of the piece 12, is e.g. comprised between 50 and 80%

The length of the fibers used is generally comprised between 60 and 200 mm.

The yarn count of the fibers is preferentially comprised between 4 (bi-component fiber) and 17 dtex.

The crimping of the fibers is preferentially comprised between 2.5 and 4 undulations per cm.

Figure 4:
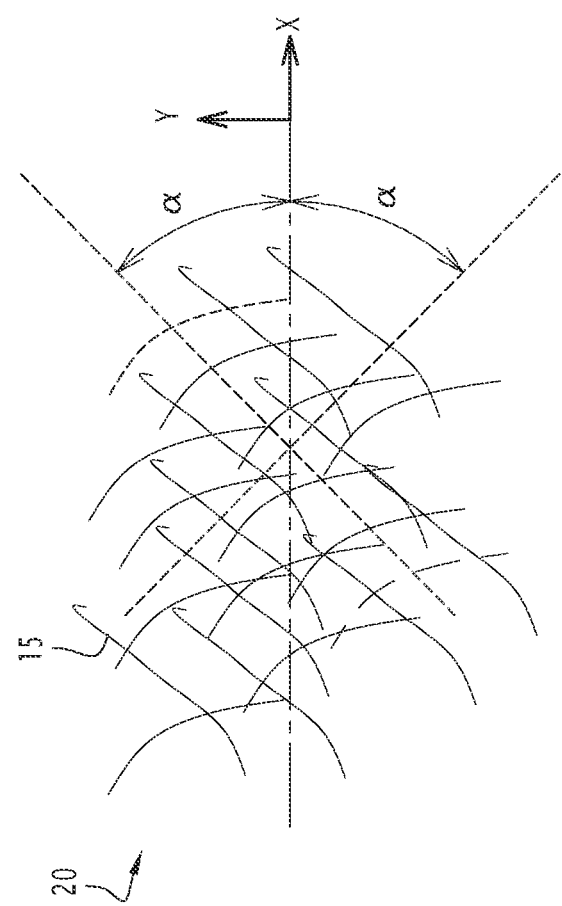
FIG. 4 schematically shows, in a top view, fibers of a fiber web which are passed through the system shown in FIG. 1.

The manufacturing system 10 comprises a carding system 18 suitable for producing a carding web 20 extending along a longitudinal direction X, corresponding to a production direction (machine direction). The card web 20, schematically shown in FIG. 4, includes said first fibers 15, predominantly oriented along an orientation direction forming an angle α with the longitudinal direction X. The carding system 18 is configured so that the orientation direction forms an angle α comprised between 5 and 10° with the longitudinal direction X.

It will be noted that the angle α is a mean angle, i.e. the orientation of every fiber can slightly deviate from the angle α, but that the mean of the angles formed by the orientations of all the fibers is substantially equal to the angle α.

Moreover, the carding system 18 is configured so that the carding web 20 has an area density comprised between 80 and 120 g/m$^2$.

It will be noted that the adjustment of a carding system 18 for obtaining a desired orientation of the fibers and a desired area density is a conventional procedure for a person skilled in the art, so that a person skilled in the art will know how to configure the carding system according to the parameters indicated above.

The manufacturing method thus comprises a step of producing the card web 20 using the carding system 18.

The manufacturing system 10 comprises, downstream of the carding system 18, a drawing system 22 intended for drawing the card web 20. Thus, the manufacturing process comprises drawing the card web 20 using the drawing system 22.

The drawing system 22 is configured for performing a longitudinal drawing with a stretch ratio comprised between 1.5 and 2. It will be recalled herein that a stretch ratio is the ratio between the length of a portion of web after drawing and the length of the same portion of web before drawing Such longitudinal drawing has the effect of reducing the area density of the card web 20.

The drawing system 22 comprises e.g. a first set 24 of drive rollers, and a second set 26 of downstream drive rollers. Each set 24, 26 comprises two rollers working together between which passes the card web 20, in contact with the two rollers. The rotational drive of the rollers of each set 24, 26 thus moves the card web 20 along the longitudinal direction X.

The downstream drive rollers of the second set 26 can be rotationally moved with a speed of rotation greater than the speed of rotation of the upstream drive rollers of the first set 24, so that the card web 20 is not moved along with the same speed over the entire length thereof. The card web 20, passing between the rollers of each set 24, 26, is then stretched due to said difference in speed.

The peripheral speed of the input rollers is denoted as $V_e$ and the area density of the web taken up between the input rollers is denoted as $P_e$, the peripheral speed of the output rollers is denoted as $V_s$ and the area density of the layer taken up between the input rollers is denoted as $P_s$. The stretch ratio E can be determined by the following relation: $E = V_s/V_e = P_e/P_s$.

As indicated above, the stretch ratio E is chosen between 1.5 and 2.

We have described a drawing system 22 consisting of two sets of rollers, but the drawing could be carried out using different means.

The manufacturing system 10 includes, at the output of the drawing system 22, a looping system 28 known per se, e.g. in part similar to same described in EP 0 859 077. Such a looping system 28 is intended for looping the fibers 15 of the web 20 by setting same vertical, thus forming undulations. Thus, the manufacturing method herein comprises a step of looping the fibers 15 of the card web 20, using the looping system 28.

The looping system 28 includes a set of rotating disks 30 carried on a common transverse axis, continuously rotated at a peripheral speed preferentially equal to the speed at which the web 20 enters the looping system 28.

The rotating disks 30 are preferentially each provided on the periphery thereof with teeth for moving along the web 20.

The looping system 28 further includes looping fingers 32, every finger being arranged between two adjacent disks 30. The looping fingers 32 extend as far as one end which is substantially tangential with respect to the disks 30. In this way, every fiber 15 is prelooped by being moved along at each end by a corresponding disk 30, by moving over the corresponding looping finger 32 arranged between the two disks 30.

The routing of a fiber 15 between two adjacent disks 30 will now be described.

The fiber 15 forms an angle α with the longitudinal direction X, which is also the direction of forward motion of the card web 20 in the looping system 28.

A front part of the fiber 15 is moved along by one of the disks 30, and a rear part of this fiber 15 is moved along by the other disk 30. Since the two disks are rigidly attached to the same axis, the speeds of rotation thereof are identical.

The front part of the fiber 15 arrives first at the end of travel, against a stop which will be subsequently described. While the front part is in abutment, the rear part continues to move forward until the rear part also comes in abutment, thus bending the fiber 15 which then forms a loop.

The fibers 15 passing through the looping system 28 all have the same behavior as described above, so that all the looping fibers 15 form undulations over the width of the web 20, taken in a transverse direction Y perpendicular to the longitudinal direction X.

Every loop has a height H taken in an elevation direction perpendicular to the longitudinal direction and the transverse direction, and a width G taken in the transverse direction Y. It should be noted that the width G corresponds substantially to the interval between two adjacent disks 30.

If the relationship $\sin α ≤ G/2H$ is fulfilled, then the fibers develop exactly the same length in the loop, which provides a perfect parallelization of the fibers.

The disks are positioned in such a way that they penetrate through a depth P<H inside the brushes of a belt 33 of the same type as the brushes provided on the conveyor of a Dilour® machine. At the disks, the bristles forming the brushes are flexible enough to move apart and gather in the free space between the disks.

It was then possible to observe that such type of belt could serve as a stop as mentioned above, according to the principle described in EP0 859 077. Indeed, when no longer in the presence of the disks, the brush bristles, by returning to the initial position thereof, exert pressure on the fibers, which makes it possible to block and then maintain the structure of the undulations.

The stop mentioned above thus consist of a belt 33 of a conveyor 34. The belt 33 is an endless belt, extending between two drive rollers. The belt 33 is provided with brushes.

The belt 33 is moved, along the longitudinal direction X, with a speed lower than the tangential speed of the rotating disks 30, so that the disks have the effect of a stop for the fibers 15 leaving the rotating disks 30.

The undulations then accumulate on the brushes of the belt 33, with a density depending on the difference in speed between the rotating disks 30 and the belt 33. A person skilled in the art will know how to determine the difference in speed as a function of the desired density.

If the desired area density of the velour is e.g. 300 g/m², i.e. 600 g/m² for the sandwich structure and if the web after drawing has an area density of 50 g/m², the ratio of the speeds between the conveyor and the peripheral speed of the disks will be 600/50=12. Such high ratio guarantees operation according to the "stop" logic of EP 0 859 077.

Such system can be used for obtaining a high velour density, which is generally not achievable by conventional methods.

The brushes further prevent the fibers 15 from being moved along upwards by the disks 30, which would be detrimental to the formation of the undulations.

The manufacturing system 10 further includes a first system 36 for depositing a first layer 38 over the undulations accumulated on the brushes. The first layer 38 is formed by said fibers 17, e.g. of the same nature as the fibers of the card web 20.

The first layer 38 is pre-needle-punched.

The structure formed by the stack of undulated fibers 15 and of the first layer 38 is then intended for passing under a first needle-punching system 40 or needle-punching head, comprising at least a first needle board 41.

The assembly formed by the brush conveyor 34 and the needle boards is known per se, and e.g. consists of a Dilour® machine.

The first needle board 41 is arranged opposite the belt 33 of the conveyor 34 and can be deployed vertically toward the belt 33 so as to pierce said structure.

The needle board 41 carries a plurality of needles, leading to a needle-punching density on the order of 200 to 400 cps/cm$^2$.

The needle board 41 can be used for rigidly attaching the first layer 38 to the structure consisting of the undulations, i.e. the card web 20 [being] deposited, in full or in part, inside the brushes, by extracting fibers from the first layer 38 and making same penetrate into the card web 20. To this end, it should be remembered that the penetration of the needles on such type of Dilour® machine takes place from the top to the bottom.

The depth of penetration of the fibers of the first layer 38 into the web 20 leading to the assembly of the first layer 38 over the card web 20 can be variable, starting from a low value on the order of 0.5 to 1 mm as far as the depth of penetration P, in which case the fibers of the first layer 38 will also contribute to feeding the velour of the web 20.

During such step, the face layer 14 is formed, as is the first sole 16, by intertwining the fibers 15 with the fibers 17 of the first layer 38.

The structure formed by the face layer 14 and the first sole is then extracted from the brushes of the conveyor in a conventional manner, then deposited over a second layer 38' coming from a second deposition system 36 '. The second deposition system 36' is e.g. arranged in a cavity at the output of the first conveyor 34.

The second layer 38' is deposited on a needle-punching table 34'.

The assembly formed by the second layer 38', over which the structure is deposited, is introduced over a second needle-punching system 40 ' comprising at least a second needle board 41' placed under the structure.

It will be noted that the needle-punching table 34 ' is not formed by a conveyor, since said assembly is driven by a winding system arranged at the end of the line, which will be subsequently described. The second needle-punching system 40' can thus consist of a conventional needle-punching machine and not of a Dilour® machine.

The second layer 38' is formed by the above-mentioned fibers 17' which are e.g. of the same nature as the fibers 17 of the first layer 38.

The second 38' layer is pre-needle-punched.

Thus, the second layer 38' is needle-punched with the web 20 in the same way as the first layer 38 was needle-punched beforehand with the same web 20.

During such step, the second sole plate 16' is formed, by intertwining the fibers 15 with the fibers 17' of the second layer 38'.

According to a conceivable variant, the manufacturing system 10 includes, downstream of the first needle-punching system, a system for turning the structure over, suitable for extracting the structure from the brushes of the conveyor 33 and for resting the structure onto the anvil of a second needle-punching system. Thus, the structure presents fibers 15 thereof upwards.

In all cases, the structure and the second layer 38' are arranged so that the second layer 38' is on the other side of the web 20 with respect to the first layer 38, so as to form a sandwich structure, with the web 20 arranged between the first 38 and second 38' layers.

The system 10 further includes a system 44 for separating the sandwich structure in two symmetrical parts, by cutting the sandwich structure parallel to the soles 16, 16', along the above-mentioned plane of symmetry P.

Such operation is carried out using a machine called a slitter which is commonly used in the field of leather and non-woven fabrics, equipped with a flexible blade and the operating logic of which is comparable to the operating logic of a band saw. It should be noted that the mechanical attachment of the sandwich structure by needle-punching is sufficient for separation.

Downstream of the separation system 44, two winding systems 47A, 47B exert a corresponding traction on the soles 16, 16', responsible for moving along the sandwich structure from the assembly with the second layer 38'. The winding systems 47A, 47B respectively wind the two parts of the structure, so as to form two rolls, one comprising the first covering 12 and the other forming the second covering 12'.

The rolls are then brought to a system 45 for binding the fibers of the face layer 14 in the first sole 16 for the first covering 12, and of the face layer in the second sole 16' for the second covering 12'. Such binding system 45 is e.g. a heat bonding apparatus, in particular a through-air oven or an infrared oven.

Binding may be carried out in any conceivable manner, e.g. by incorporating a latex into the layers 38, 38', or between each layer 38, 38' and the web 20, or by incorporating hot-melt binding fibers among the fibers of the web 20 and/or into each layer 38, 38'. Binding fibers are generally preferred to latex, since same are recyclable. Such binding which is required for all needle-punched type constructions in order to provide a sufficient cohesion of the velour fibers with the sole and to prevent tearing or abrasion issues, is carried out in a conventional manner and will thus not be described in more detail.

It should be noted that, in order for the velour to have an optimal appearance, in particular an optimal density, and for the velour not to have prematurely broken fibers in the looping disks, which would be detrimental to general appearance thereof, the fiber orientation angle $\alpha$ has to fulfill the relation $\sin \alpha \leq G/2H$ within +/−5° of accuracy.

It should be noted that, in the case of coverings made from a sandwich structure by separating the structure, the necessary loop height is approximately H=15 mm (in particular due to the significant shrinkage of the PET material after separation). Such a height corresponds to a small angle on the order of 2°.

Thus, a direct card web is used, such a web with a mean fiber angle comprised between 5 and 10°. It is found that the relations $\sin \alpha \leq G/2H$ is indeed fulfilled, which provides a good parallelization of the fibers in the velour. It has indeed been found that such a card web is optimal for obtaining a sufficient height for producing coverings from a separate sandwich structure.

It also emerged that a complementary drawing directly before entering the looping system 28, with a stretch ratio comprised between 1.5 and 2, reduces the area density of the web and limits the forces during looping without significantly modifying the angle α and therefore without being detrimental to the quality of the product. An optimal result can be obtained in this way.

The invention claimed is:

1. A manufacturing method for manufacturing floor coverings for motor vehicles, comprising:
    producing a web of fibers, elongated along a longitudinal direction, the fibers of which having an orientation forming a mean angle with respect to the longitudinal direction,
    passing the fiber web along the longitudinal direction through a looping system comprising a set of rotating disks and fixed looping elements so as to generate undulations,
    following the passing step, bringing the layer over a conveyor equipped with brushes, and accumulating the undulations in the brushes so as to reach a predetermined density,
    depositing a first pre-needle-punched layer of fibers over the accumulated undulations,
    first assembling the accumulated undulations with the first pre-needle-punched layer by needle-punching through the brushes so as to obtain a structure,
    wherein the manufacturing method comprises:
    second assembling the structure with a second pre-needle-punched layer of fibers so as to obtain a sandwich structure, and
    separating the sandwich structure so as to obtain two symmetrical velour coverings,
    wherein:
    the web is a card web with a mean angle of orientation of the fibers comprised between 5 and 10° and an area density comprised between 80 and 120 g/m², and
    the method comprises, prior to the passing step, longitudinally drawing the web, with a stretch ratio comprised between 1.5 and 2, for reducing the area density thereof.

2. The manufacturing method according to claim 1, wherein the undulations are formed by loops each having a predefined width G along a transverse direction perpendicular to the longitudinal direction, and a predefined height H along an elevation direction perpendicular to the longitudinal and transverse directions, the mean angle α of orientation of the fiber of web with respect to the longitudinal direction fulfilling the relation sin α=G/2H within an accuracy of +/−5°.

3. The manufacturing method according to claim 1, wherein the fibers of the web, the fibers of the first layer, and the fibers of the second layer are selected from fibers made of a thermoplastic polymer selected from the group consisting of polypropylene, Polyethylene terephthalate, polyamide, polylactic acid, and mixtures or copolymers thereof, or fibers of natural origin selected from the group consisting of flax and hemp fibers used alone or as mixtures.

4. The manufacturing method according to claim 1, wherein the fibers of the web, the fibers of the first web, and the fibers of the second web are all made of the same material.

5. The manufacturing method according to claim 1, wherein at least two sets amongst the fibers of the web, the fibers of the first layer, and the fibers of the second layer are made of different materials.

6. The manufacturing method according to claim 1, comprising turning the structure over following the first assembling step and prior to the second assembling step.

7. A system for manufacturing floor coverings for motor vehicles, comprising:
    a system for making a web of fibers elongated along a longitudinal direction, configured for giving the fibers an orientation forming a mean angle with respect to the longitudinal direction,
    a looping system comprising a set of rotating disks and fixed looping elements so as to generate undulations,
    a conveyor equipped with brushes, arranged at the output of the looping system for accumulating the undulations in the brushes so as to reach a predetermined density,
    a first system for depositing a first pre-needle-punched layer of fibers over the accumulated undulations,
    a first needle-punching system, for assembling the accumulated undulations with the first pre-needle-punched layer by needle-punching through the brushes so as to obtain a structure,
    wherein the manufacturing system includes:
    a second system for depositing a second pre-needle-punched layer of fibers over the accumulated undulations of the structure, so as to obtain a sandwich structure, and
    a system for separating the sandwich structure so as to obtain two symmetrical velour coverings,
    and wherein:
    the web-making system is a carding machine configured so that the carding web produced has a mean angle of orientation of the fibers comprised between 5 and 10°, and an area density comprised between 80 and 120 g/m²,
    the manufacturing system includes, upstream of the looping system, a drawing system for the longitudinal drawing of the web, configured for applying a stretch ratio comprised between 1.5 and 2.

8. The manufacturing system according to claim 7, wherein the drawing system includes a first set of upstream drive rollers, and a second set of downstream drive rollers, the downstream drive rollers of the second set being apt to rotationally move with a speed of rotation higher than the speed of rotation of the upstream drive rollers of the first set so that the card web is not moved along with the same speed over the entire length thereof.

9. The manufacturing system according to claim 7, including, downstream of the first needle-punching system and upstream of the second depositing system, a turning system for turning the structure over.

* * * * *